US012788188B2

(12) United States Patent
Nathan et al.

(10) Patent No.: US 12,788,188 B2
(45) Date of Patent: Nov. 10, 2026

(54) MODULAR STORAGE APPARATUS FOR STORING CULINARY CONTAINERS

(71) Applicant: Caraway Home, Inc., New York, NY (US)

(72) Inventors: Jordan Nathan, New York, NY (US); Sean Palmieri, New York, NY (US); Jordan Armitage, New York, NY (US); Bret Recor, Princeville, HI (US); Dickon Isaacs, Los Altos, CA (US); Christoph Andrejcic, San Francisco, CA (US); Rebecca Kay, San Francisco, CA (US); Benjamin Gross, San Francisco, CA (US)

(73) Assignee: Caraway Home, Inc., New York, NY (US)

( * ) Notice: Subject to any disclaimer, the term of this patent is extended or adjusted under 35 U.S.C. 154(b) by 22 days.

(21) Appl. No.: 19/098,918

(22) Filed: Apr. 2, 2025

(65) Prior Publication Data

US 2026/0305879 A1 Oct. 8, 2026

(51) Int. Cl.
*A47G 21/14* (2006.01)
*A47J 47/02* (2006.01)
(Continued)

(52) U.S. Cl.
CPC ............... *A47J 47/16* (2013.01); *A47J 47/02* (2013.01); *B65D 25/24* (2013.01)

(58) Field of Classification Search
CPC ............ A47J 47/16; A47J 47/02; B65D 25/24
(Continued)

(56) References Cited

U.S. PATENT DOCUMENTS

| | | | | |
|---|---|---|---|---|
| 3,918,576 A * | 11/1975 | Taub | .................... | B65D 5/5246 206/767 |
| 4,148,427 A * | 4/1979 | Baker | .................. | B65D 85/505 229/117.35 |

(Continued)

FOREIGN PATENT DOCUMENTS

| | | | |
|---|---|---|---|
| CA | 3217069 A1 | 4/2024 |
| CN | 119453674 A | 2/2025 |
| WO | 2021071817 A1 | 4/2021 |

OTHER PUBLICATIONS

Extended European Search Report of the European Patent Office in the related European Patent Appl. No. 26168868.3, dated Aug. 11, 2026, 35 pages.

(Continued)

*Primary Examiner* — Andrew D Perreault
(74) *Attorney, Agent, or Firm* — Bochner PLLC; Andrew D. Bochner

(57) ABSTRACT

Aspects of the present disclosure may include an organizer for storing culinary receptacles comprising: a base including: a top surface, a bottom surface, an exterior sidewall disposed between the top surface and the bottom surface, and a first plurality of magnets disposed within the exterior sidewall; and a curtain including: a front surface, a back surface, the front and back surface bound by: a top edge, a bottom edge, a first side edge, and a second side edge, and a second plurality of magnets disposed within the front surface, the second plurality of magnets reversibly couplable to the first plurality of magnets, such that the organizer may be in at least one of a coupled configuration and a decoupled configuration.

9 Claims, 9 Drawing Sheets

(51) Int. Cl.
*A47J 47/16* (2006.01)
*B65D 25/24* (2006.01)

(58) Field of Classification Search
USPC ................................ 206/767, 768; 220/4.01
See application file for complete search history.

(56) References Cited

U.S. PATENT DOCUMENTS

| | | | | |
|---|---|---|---|---|
| 5,056,677 | A | 10/1991 | Toyosawa | |
| D333,841 | S | 3/1993 | Henricksen | |
| 5,581,923 | A * | 12/1996 | Brandstetter | G09F 1/12 248/447 |
| 5,706,597 | A * | 1/1998 | Brandstetter | G09F 1/12 40/539 |
| D406,478 | S | 3/1999 | Rahman | |
| D519,441 | S | 4/2006 | Lee | |
| D573,008 | S | 7/2008 | Sipe | |
| D799,310 | S | 10/2017 | Bacallao | |
| D964,053 | S | 9/2022 | Yu | |
| 12,054,322 | B2 * | 8/2024 | Kuhn | B65D 5/22 |
| D1,065,332 | S | 3/2025 | Lin et al. | |
| D1,076,771 | S | 5/2025 | Chen | |
| D1,116,552 | S | 3/2026 | Zhang et al. | |
| D1,131,090 | S | 6/2026 | Bu et al. | |
| 2006/0243632 | A1 * | 11/2006 | Trahan | B65D 1/34 206/557 |
| 2008/0217340 | A1 * | 9/2008 | Jager | B65D 21/0204 220/524 |
| 2008/0237084 | A1 * | 10/2008 | Hopkins | A47F 7/146 206/561 |
| 2025/0072639 | A1 * | 3/2025 | Nathan | A47G 21/14 |
| 2025/0194823 | A1 | 6/2025 | Gan et al. | |

OTHER PUBLICATIONS

Notice of Allowance of the United States Patent and Trademark Office (USPTO) in related U.S. Appl. No. 30/027,404, dated Jun. 30, 2026, 6 pages.

* cited by examiner

MODULAR STORAGE APPARATUS FOR STORING CULINARY CONTAINERS

FIELD OF THE PRESENT DISCLOSURE

The present disclosure is directed to a modular storage apparatus for storing culinary containers. More specifically, the present disclosure is directed to a modular storage apparatus for efficient storage of non-uniform culinary containers.

INTRODUCTION

Food storage containers are an essential component of modern kitchens, providing a convenient means to store leftovers, previously prepared meals, and dry goods. However, despite their utility, these containers often present a significant organizational challenge. The irregular shapes, varying sizes, and mismatched lids can lead to inefficient use of cabinet space, creating frustration for homeowners and limiting available storage capacity. Given the frequent use of storage containers, in conjunction with limited space in most residential kitchens, efficient storage of said containers is of paramount importance.

One of the primary issues with food storage containers is their tendency to consume disproportionate amounts of cabinet space. Unlike stackable dishware, food storage containers often come in multiple shapes and sizes that do not nest neatly within one another. This inconsistency leads to wasted space, particularly when lids are stored separately or when smaller containers are placed haphazardly inside larger ones. Additionally, many storage bins have curved edges, which further reduces their ability to sit flush against one another, leading to inefficient storage arrangements. The problem is further exacerbated by the accumulation of mismatched containers. Over time, many households amass a collection of containers from various brands, each with its own unique shape and design. Such variety in shapes and sizes makes it difficult to create a streamlined storage system, as lids and bases may not be interchangeable. As a result, cabinets become cluttered with an assortment of containers that do not store compactly, leading to a disorganized and chaotic storage space.

Thus, it would be desirable to provide an apparatus for providing efficient storage of culinary containers. It would be further desirable to provide an apparatus that also encourages easy access of said containers. It would be yet further desirable to provide an apparatus for storing containers that are modular, customizable, reliable, and durable, in order to fit any kitchen cabinet size or structure. Such systems and devices incorporating such advantageous features are hereby provided.

SUMMARY

This Summary is provided to introduce a selection of concepts in a simplified form that are further described below in the Detailed Description. This Summary is not intended to identify key features or essential features, nor is it intended to limit the scope of the claims included herewith.

Aspects of the present disclosure may be directed to an organizer for storing culinary receptacles. In an embodiment, the organizer for storing culinary receptacles may be comprised of a base including: a top surface, a bottom surface, an exterior sidewall disposed between the top surface and the bottom surface, and a first plurality of magnets disposed within the exterior sidewall; and a curtain including: a front surface, a back surface, the front and back surface bound by: a top edge, a bottom edge, a first side edge, and a second side edge, and a second plurality of magnets disposed within the front surface, the second plurality of magnets reversibly couplable to the first plurality of magnets, such that the organizer may be in at least one of a coupled configuration and a decoupled configuration.

In an embodiment, the base may be further comprised of an interior sidewall disposed about the top surface.

In another embodiment, the base may be further comprised of a base top edge disposed between the exterior sidewall and the interior sidewall.

Furthermore, the top surface, the interior sidewall, and the base top edge may define an organizer storage cavity able to house a plurality of storage containers.

In yet a further embodiment, the curtain may be further comprised of: a first bullnose disposed between the top edge and the first side edge, and a second bullnose disposed between the top edge and the second side edge.

Additionally, the organizer for storing culinary receptacles may be further comprised of one or more feet disposed upon the bottom surface of the base.

In one embodiment, at least one of the base and the curtain may be covered in a fabric covering. In such an embodiment, the fabric covering may conceal at least one of the first plurality of magnets and the second plurality of magnets.

Moreover, the base may be further comprised of an exterior sidewall length and an exterior sidewall width. In another embodiment, in the coupled configuration, the curtain may be disposed upon the exterior sidewall length.

In an embodiment, in the coupled state, the exterior sidewall of the base and the front surface of the curtain interface such that a juncture may be formed.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

Figure 1:
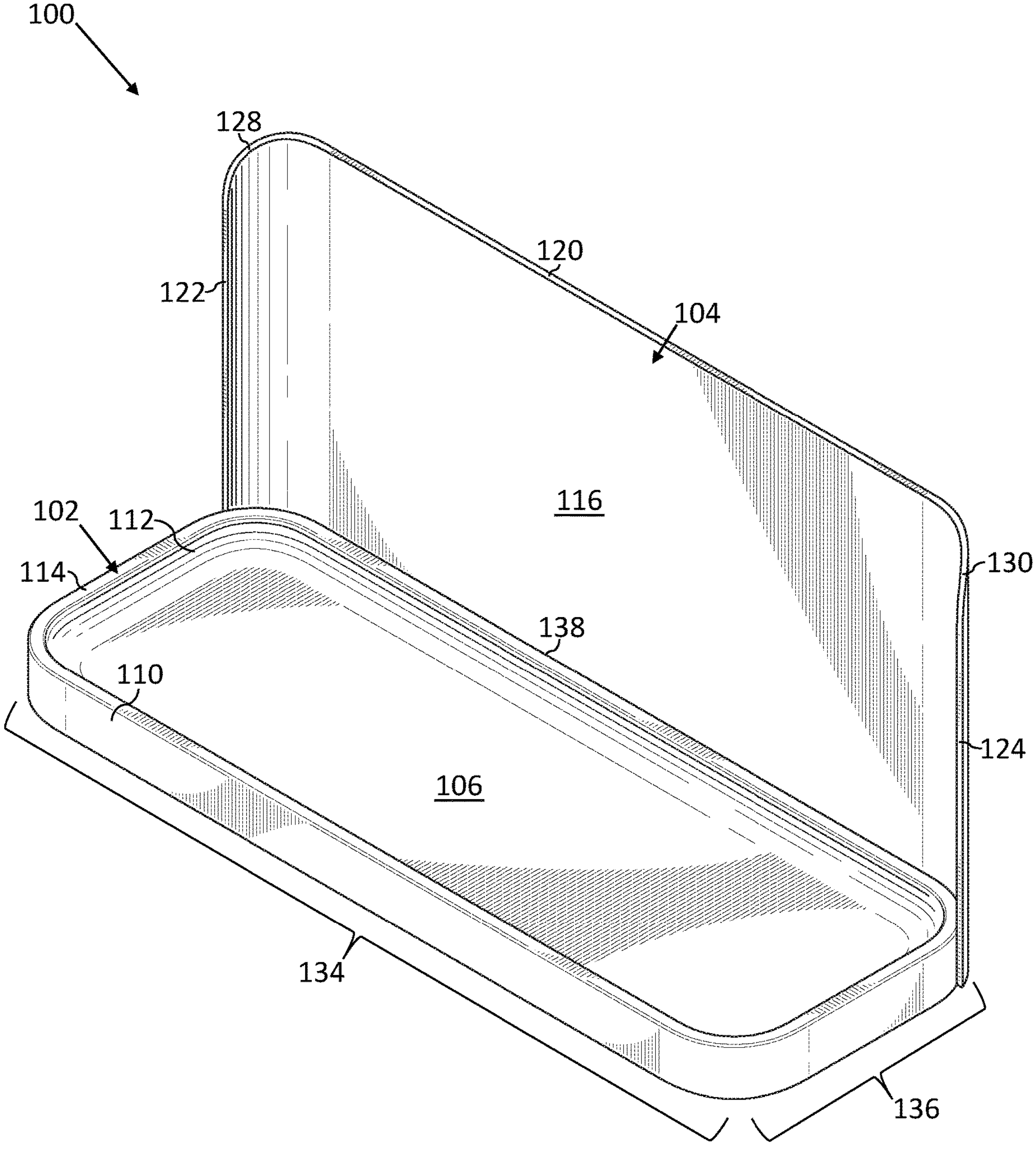
FIG. 1 illustrates an embodiment of an organizer for storing culinary containers in a coupled configuration.
Figure 2:
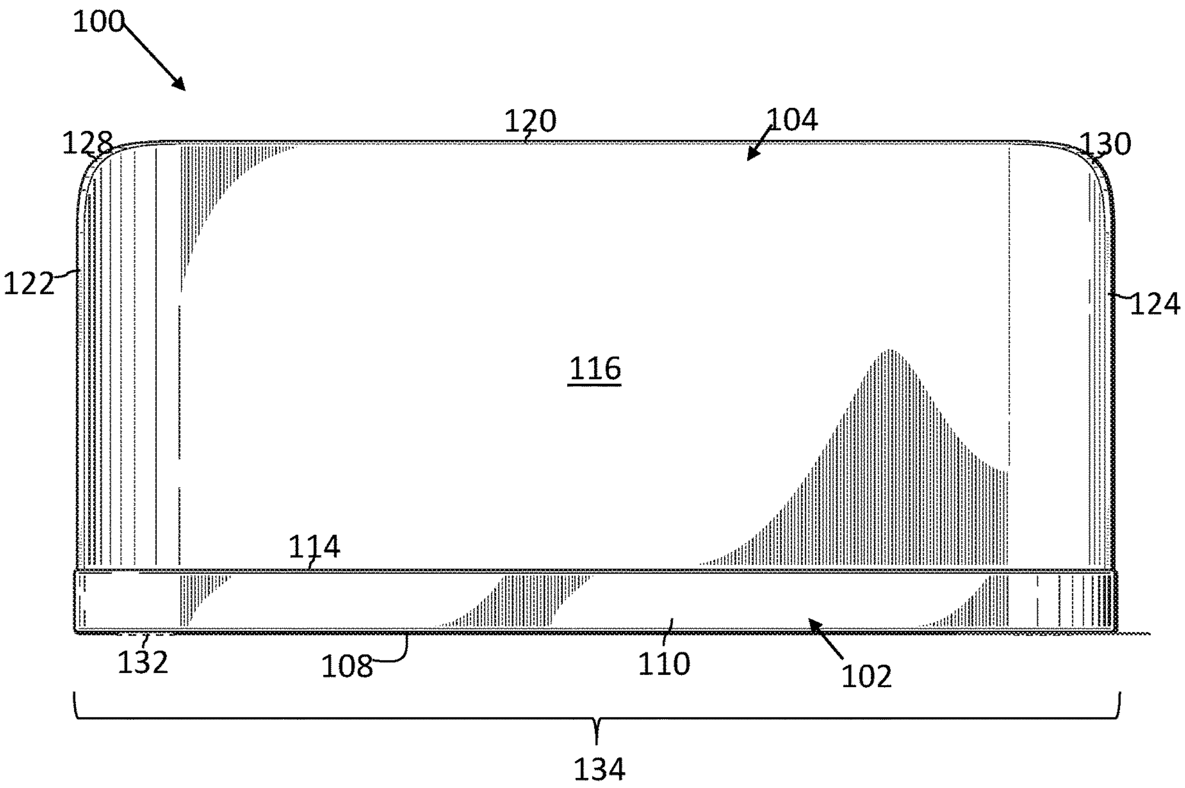
FIG. 2 illustrates an embodiment of the organizer for storing culinary containers in the coupled configuration.
Figure 3:
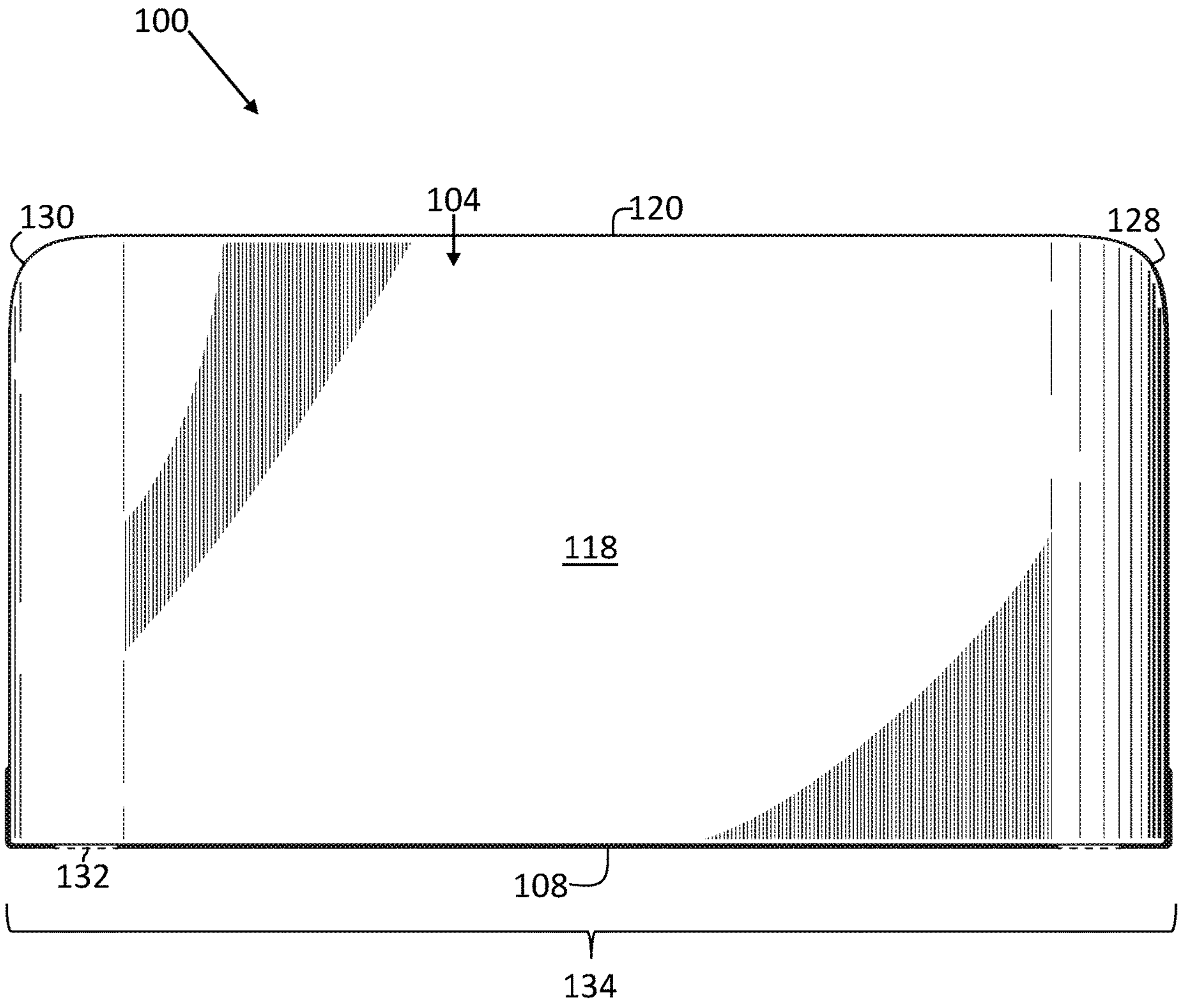
FIG. 3 illustrates an embodiment of the organizer for storing culinary containers in the coupled configuration.
Figure 4:
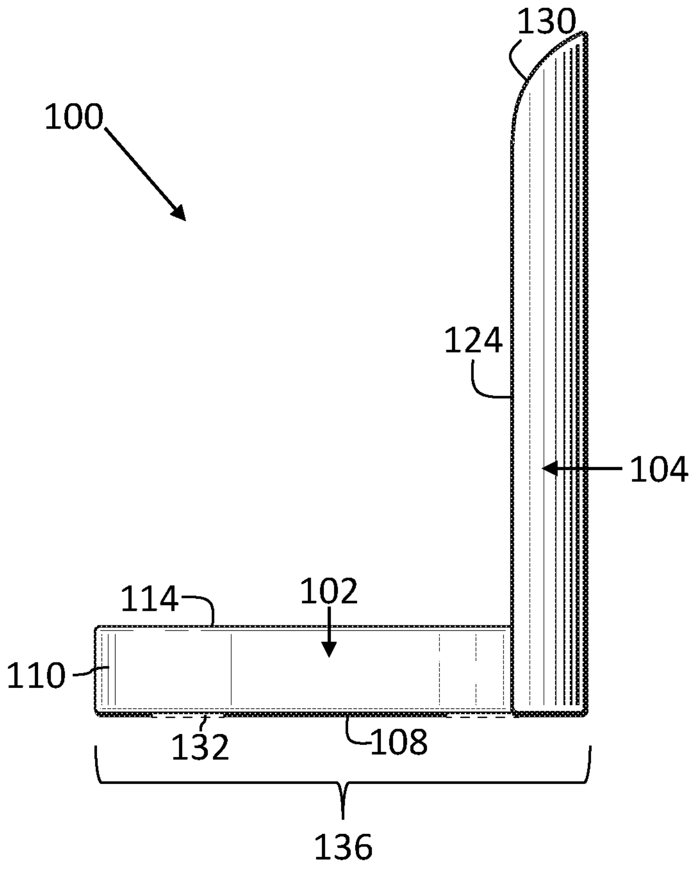
FIG. 4 illustrates an embodiment of the organizer for storing culinary containers in the coupled configuration.
Figure 5:
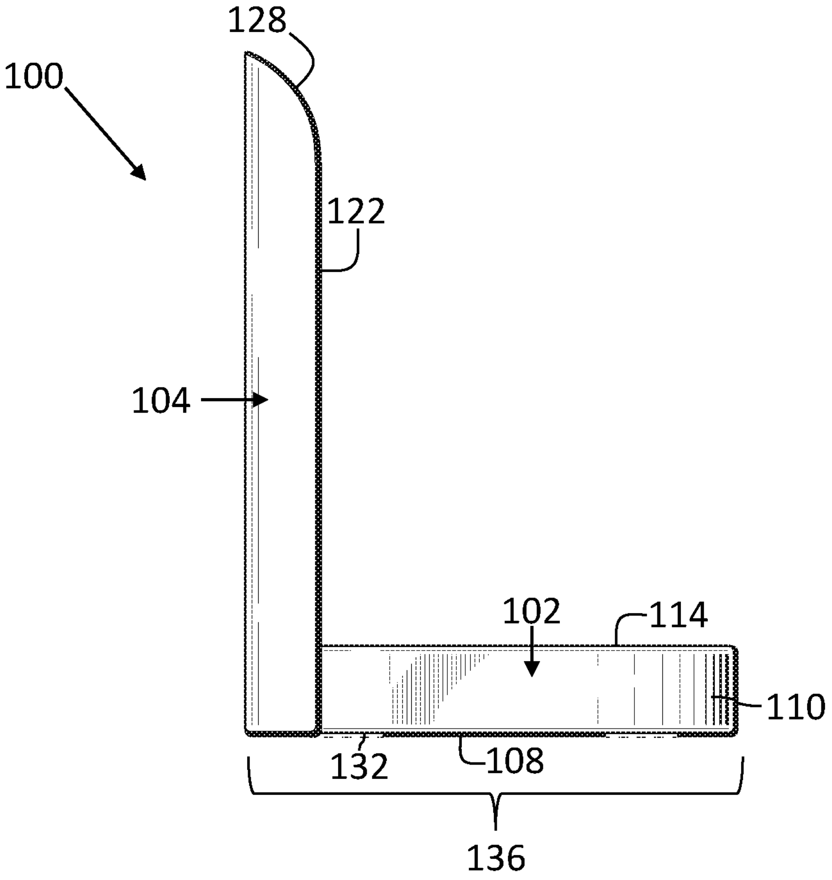
FIG. 5 illustrates an embodiment of the organizer for storing culinary containers in the coupled configuration.
Figure 6:
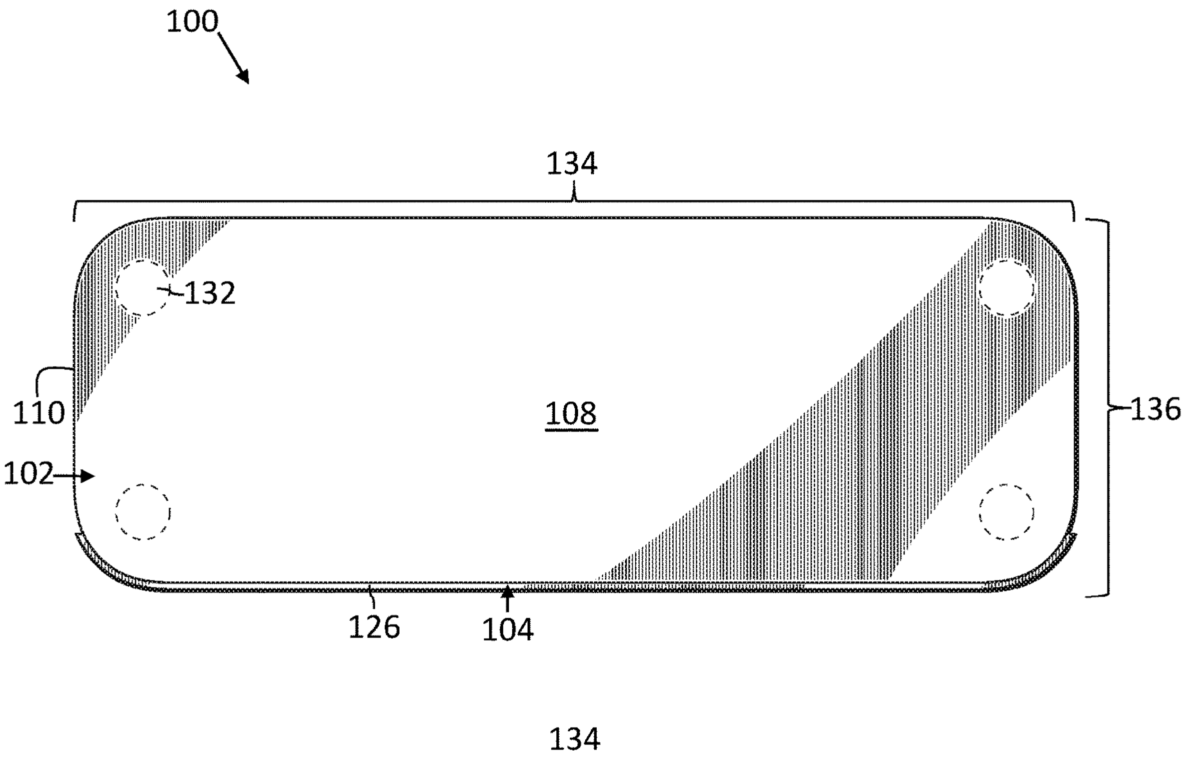
FIG. 6 illustrates an embodiment of the organizer for storing culinary containers in the coupled configuration.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Aspects of the present disclosure may include an organizer for storing culinary containers (the "container organizer" or "organizer") 100. The container organizer 100 may reduce a storage footprint required to store a plurality of culinary storage containers 200. For example, the container organizer 100 may be sized such that it may occupy a storage footprint less than those of presently existing storage solutions. That is, the organizer 100 may occupy minimal countertop and/or cabinet storage space to facilitate improved storage of the plurality of storage containers 200.

Turning to FIGS. 1-6, the container organizer 100 may be comprised of a base 102 and/or a curtain 104. In an embodiment, the base 102 and the curtain 104 may be reversibly coupled such that a user may configure the organizer 100 to fit a variety of kitchen configurations. For instance, the base 102 and curtain 104 may be coupled allowing the organizer 100 to reside upon a countertop while providing sufficient support to house the plurality of storage containers 200. In another example, the base 102 and the curtain 104 may be decoupled such that a user may store the organizer 100 in a cabinet without said organizer 100 occupying vertical cabinet space.

In an embodiment, the base 102 may be comprised of at least one of a top surface 106 and a bottom surface 108. Further, the base 102 may additionally include an exterior sidewall 110 disposed between the top 106 and bottom 108 surfaces. To illustrate, the exterior sidewall 110 may rise above the top surface 106 such that said top surface 106 is recessed relative to a top of the exterior sidewall 110.

In another embodiment, the base 102 may be further comprised of an interior sidewall 112. In such an embodiment, the interior sidewall 112 may rise above the top surface 106 such that said sidewall 112 matches the difference in height between the top surface 106 and the exterior sidewall 110.

Furthermore, the base 102 may also be comprised of a top edge 114 disposed between the exterior 110 and interior 112 sidewalls. For instance, the top edge 114 may define a perimeter of the base 102.

In one embodiment, the interior sidewall 112 may be curved, thus forming a seamless transition between the top surface 106 and the top edge 114. In such an embodiment, the curvature of the interior sidewall 112 may accommodate a plurality of storage containers 200 having rounded edges. Alternatively, the interior sidewall 112 may be straight, such that it forms a right angle where it meets the top surface 106. Such a right angle may allow for the organizer 100 to accommodate a plurality of storage containers 200 having straight edges.

Figure 9:
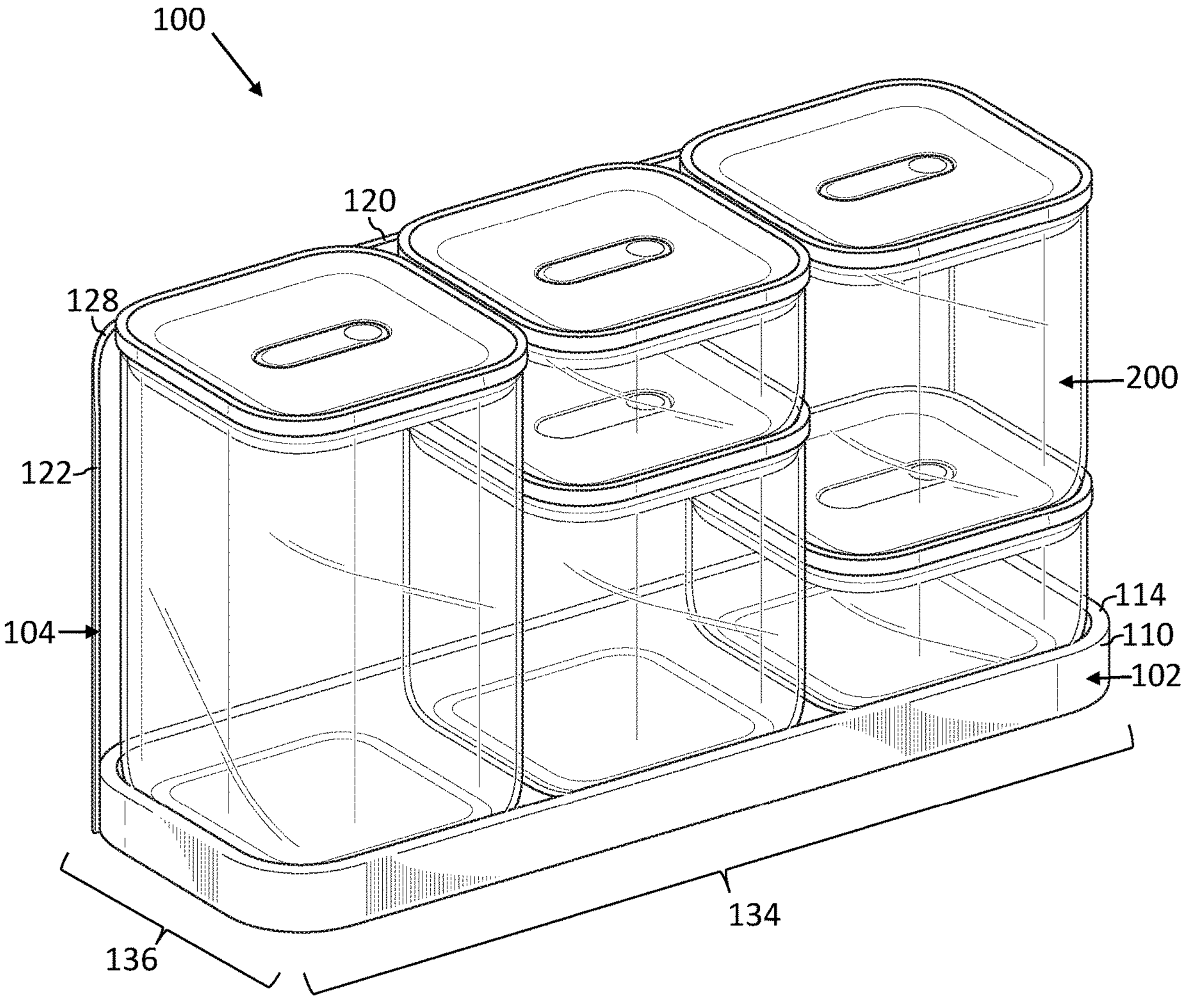
FIG. 9 illustrates an embodiment of the organizer storing a plurality of culinary containers.

Moreover, the base 102 may be further comprised of a storage cavity. In an embodiment, the storage cavity may be bound by at least one of the top surface 106, the interior sidewall 112, and the top edge 114. Meaning, the plurality of storage containers 200 may be housed by the base 102 via its storage cavity (as illustrated in FIG. 9). While housed, the plurality of containers 200 may interface with the top surface 106 and/or the interior sidewall 112.

In a further embodiment, the base 102 may be comprised of a rigid material including, but not limited, to ceramic; glass; metals including, aluminum and/or stainless steel; plastics such as, Acrylonitrile Butadiene Styrene (ABS), Polypropylene (PP), Polyethylene Terephthalate (PET), High-Density Polyethylene (HDPE); porcelain; or woods such as, birch or medium-density fiberboard (MDF). In an exemplary embodiment, the base 102 may be comprised of birch wood.

Moving on, as discussed above, the organizer 100 may include the curtain 104. In an embodiment, the curtain 104 may be comprised of a front surface 116 and a back surface 118. Additionally, the front 116 and back 118 surfaces may be bound by at least one of a top edge 120, a first side edge 122, a second side edge 124, and a bottom edge 126.

Moreover, the curtain 104 may be further comprised of a first bullnose 128 and a second bullnose 130. In an embodiment, the first bullnose 128 may be disposed between the top edge 120 and the first side edge 122. Alternatively, the first bullnose 128 may be disposed between the top edge 120 and the second side edge 124. In another embodiment, the second bullnose 130 may be disposed between the top edge 120 and the second side edge 124. However, the second bullnose 130 may alternatively be disposed between the top edge 120 and the first side edge 122.

Yet further, the first 128 and second 130 bullnoses may define a transition between the top edge 120 and the first 122 and second 124 side edges. For instance, said bullnoses 128/130 may be curved, thus forming a seamless transition between the top edge 120 and the first 122 and second 124 side edges. Such curved bullnoses 128/130 may be less jagged and, thus, less likely to cause snags (as opposed to a sharp ninety-degree corner) when depositing the plurality of containers 200 within the organizer 100. Additionally, the curvature of the bullnoses 128/130 may improve the safety of the organizer 100 by preventing a user from sustaining abrasions due to inadvertent contact with said bullnoses 128/130. However, said bullnoses 128/130 may alternatively form a right angle between the top edge 120 and the first 122 and second 124 side edges.

In another embodiment, similar to the base 102, the curtain 104 may also be comprised of the rigid material. Specifically, the curtain 104 may be comprised of MDF. Thus, as a nonlimiting example, the base 102 and curtain 104 may be comprised of varying materials, wherein the base 102 is comprised of birch wood, while the curtain 104 is comprised of MDF.

As mentioned above, the base 102 and the curtain 104 may be reversibly coupled. Thus, the organizer 100 may be configurable into at least one of a coupled configuration and a decoupled configuration. While in the coupled configuration, the base 102 and the curtain 104 may form a juncture 138. To illustrate, while in the coupled configuration, the exterior sidewall 110 of the base 102 may interface with the front surface 116 of the curtain 104, thus forming the juncture 138. In particular, the front surface 116 may interface with the exterior sidewall 110 along its length 134. Alternatively, the front surface 116 may interface with the exterior sidewall 110 along its width 136. As a nonlimiting example, the length 134 of the exterior sidewall 110 may be greater than its width 136.

Figure 7:
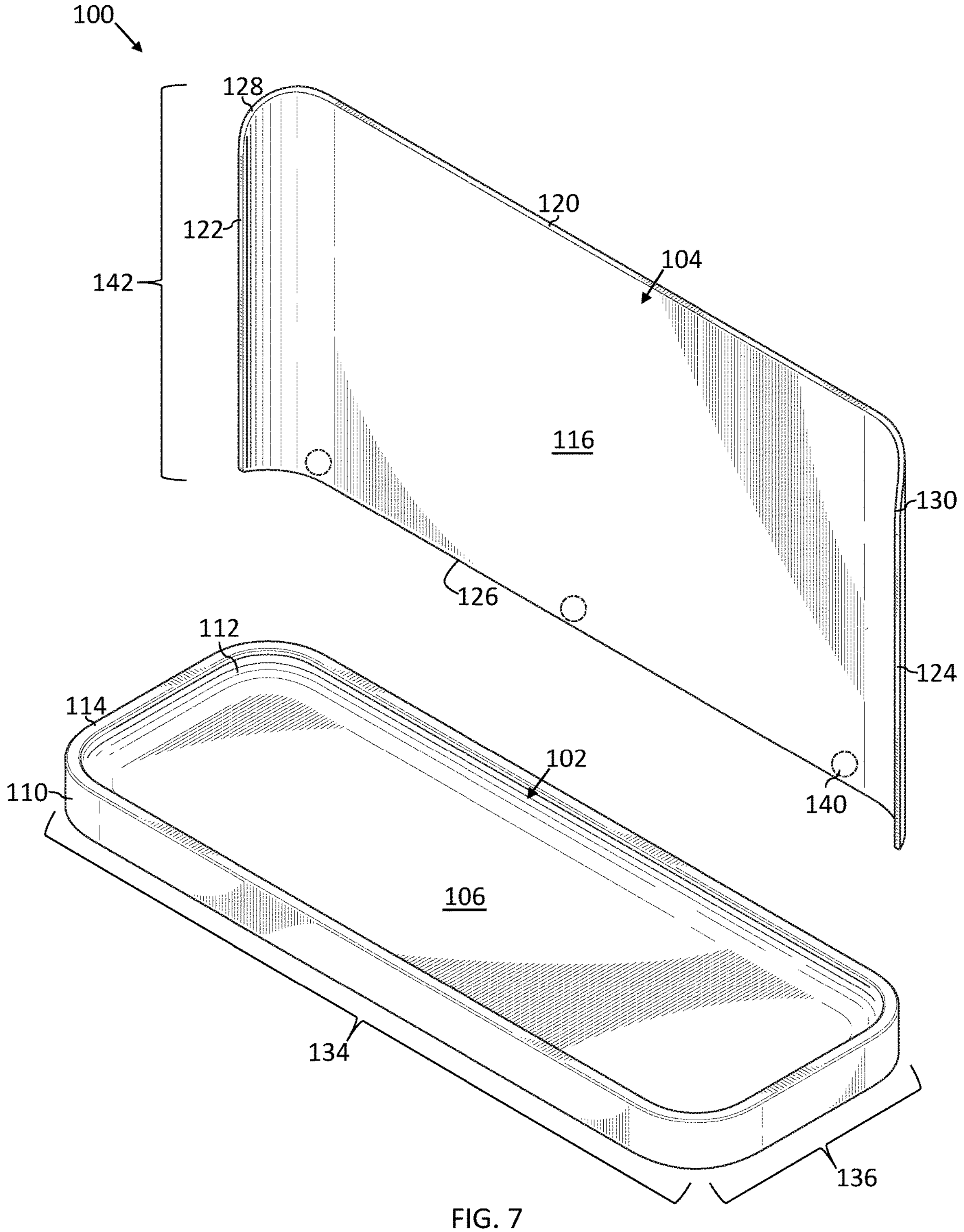
FIG. 7 illustrates an embodiment of the organizer for storing culinary containers in a decoupled configuration.
Figure 8:
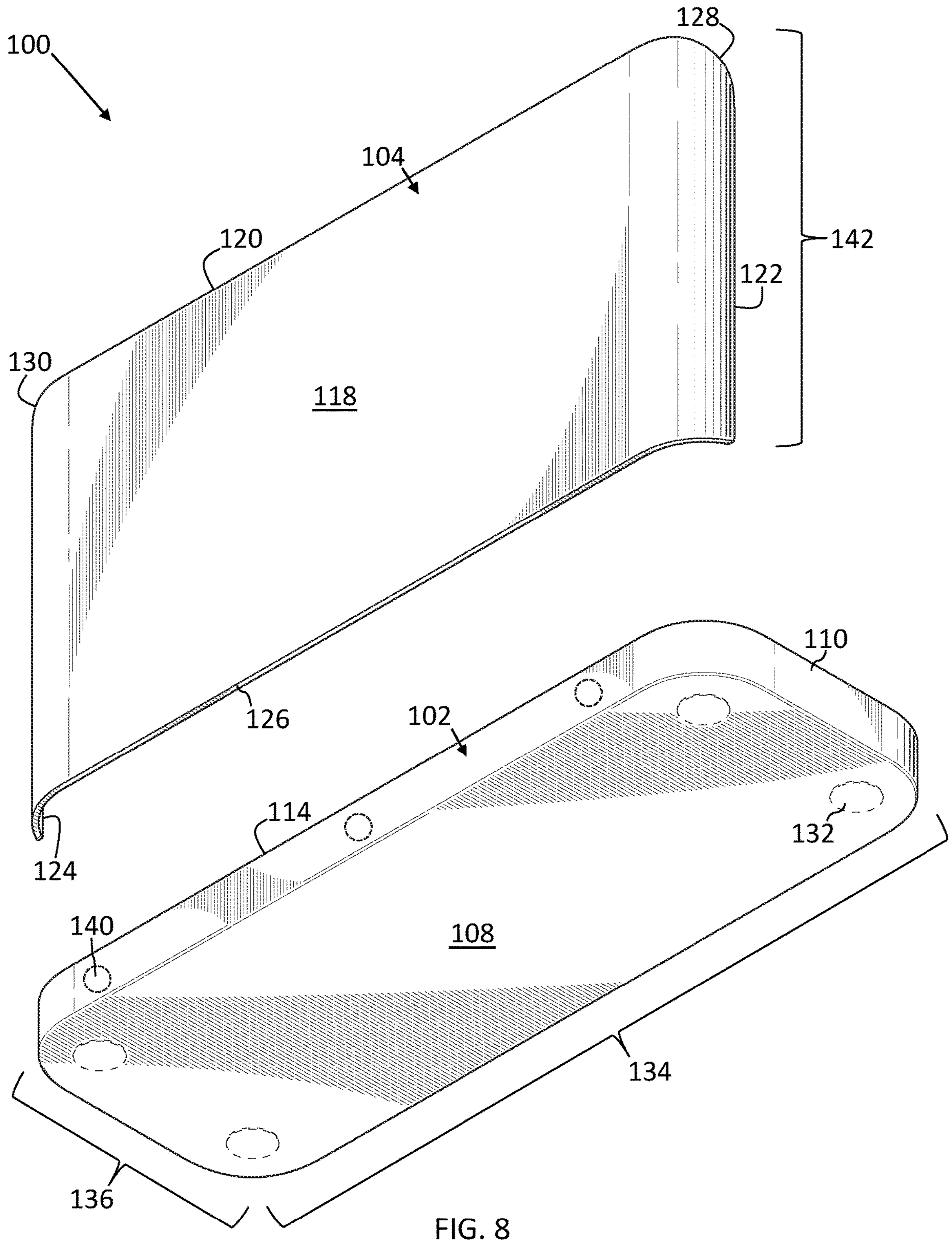
FIG. 8 illustrates an embodiment of the organizer for storing culinary containers in the decoupled configuration.

Now referring to FIGS. 7 and 8, the reverse coupling of the base 102 to the curtain 104 may be facilitated by a plurality of magnets 140. For instance, the plurality of magnets 140 may be disposed in the exterior sidewall 110 of the base 102 and/or the front surface 116 of the curtain 104.

To illustrate, a first plurality of magnets may be disposed within the exterior sidewall 110 along the length 134, such that the front surface 116 may reversibly couple to either side of the base 102. Specifically, the length 134 of the exterior sidewall 110 may include the first plurality of magnets, and the bottom portion of the front surface 116 may include a second plurality of magnets having a polarity opposite those of the first plurality, such that the curtain 104 may reversibly couple to the base 102, or vice versa.

Additionally, the base 102 may be formed into a geometric shape. As a nonlimiting example, the base 102 may be formed into a chamfered rectangle with rounded corners. Further, the curtain 104 may be formed into a shape corresponding with that of the base 102. However, those having ordinary skill in the art will appreciate the base 102 may be formed into any suitable shape alternative.

As a further nonlimiting example, the curtain 104 may exhibit a curvature, ensuring the curtain 104 seamlessly interfaces with the rounded corners of the base 102 when formed into the chamfered rectangle. In particular, the front surface 116 of the curtain 104 may curve inwards towards the base 102, when in the coupled configuration to ensure there is a seamless interface between the front surface 116 and the exterior sidewall 110. Thus, when in the coupled configuration, the front surface 116 of the curtain 104 interfaces with the entirety of the length 134 of the exterior sidewall 110 and partially interfaces with the width 136. For example, when in the coupled configuration, the curtain 104 may interface with less than 25% of the total width 136 of the exterior sidewall 110.

Furthermore, as previously mentioned, when in the coupled configuration, the curtain 104 may interface with the entirety of the length 134 of the exterior sidewall 110. As a nonlimiting example, when the curtain 104 is coupled to the base 102, the bottom edge 126 may be flush to the bottom surface 108. That is, the bottom edge 126, and the bottom surface 108 may form a uniform surface when the curtain 104 is coupled to the base 102. Such a uniform surface amongst the bottom edge 126 and the bottom surface 108 may ensure the organizer 100 is stable necessarily preventing tipping or wobbling when placed on a countertop or inside a cabinet by increasing a contact surface area with said countertops or cabinets.

Moreover, when in the coupled configuration, the base 102 may interface with greater than 10%, but less than 20% of a height 142 of the curtain. Specifically, the exterior sidewall 110 when coupled to the front surface 116, may interface with greater than 12%, but less than 15% of the height 142 of the curtain 104.

The curtain 104 is designed to interact with the base 102 in a manner that enhances both the aesthetic appeal and functional utility of the organizer 100. For instance, the curtain 104, exhibiting a curvature, is specifically engineered to align seamlessly with the rounded corners of the base 102, particularly when the base 102 is configured into a chamfered rectangle. This curvature ensures that the curtain 104 not only complements the geometric design of the base 102 but also provides a smooth transition between the two components, minimizing any gaps or misalignments that could detract from the overall appearance or functionality of the organizer 100.

In the coupled configuration, the curtain 104 may interface with the exterior sidewall 110 of the base 102. The front surface 116 of the curtain 104 is designed to align flush against the exterior sidewall 110, forming a continuous surface with the exterior sidewall 110 at the juncture 138, that enhances the structural integrity of the organizer 100. This alignment is facilitated by the precise curvature of the curtain 104, which matches the contour of the base 102, allowing for a snug fit that prevents the curtain 104 from shifting or detaching unintentionally.

Moreover, the interaction between the curtain 104 and the base 102 is further stabilized by the use of the plurality of magnets 140. These magnets 140 may be strategically embedded within the front surface 116 of the curtain 104 and the exterior sidewall 110 of the base 102. To illustrate, the magnets 140 may be positioned such that the curtain 104 can be easily attached to or detached from the base 102, providing flexibility in configuring the organizer 100 to suit various storage needs. The magnetic coupling not only secures the curtain 104 in place but also allows for quick reconfiguration, enabling users to adapt the organizer 100 to different kitchen layouts or storage requirements.

In yet another embodiment, at least one of the base 102 and the curtain 104 may be covered in a fabric covering. For instance, the fabric covering may conceal the first plurality of magnets disposed within the base 102 and/or the second plurality of magnets disposed within the curtain 104.

The fabric covering may include at least one of 720D cotton/linen fabric, 1 MM, waterproof, and 200-210 gsm. Furthermore, the fabric covering may accommodate a weave pattern for texture. However, the fabric covering may be comprised of any suitable textile alternative. In one embodiment, the fabric covering may be treated with a spray finish, for example, a clear coat finish. Such a spray finish may increase the integrity of the organizer 100 both structurally and aesthetically (for example, preventing stains or providing a surface that is easier to clean).

In another embodiment, the organizer 100 may be further comprised of one or more feet 132. For instance, the one or more feet 132 may be disposed upon the bottom surface 108 of the base 102. As a nonlimiting example, the one or more feet 132 may be comprised of a first foot, a second foot, a third foot, and a fourth foot, wherein each of the first foot, second foot, third foot, and fourth foot are disposed upon a first corner, second corner, third corner, and fourth corner of the bottom surface 108.

Moreover, the one or more feet 132 may provide an anti-slip surface, thus proscribing the base 102, and necessarily the organizer 100, from sliding atop a surface (e.g., a countertop) upon which it is placed due to inadvertent user contact with the organizer 100. Additionally, the one or more feet 132 may form a barrier between the bottom surface 108 and the surface upon which the organizer 100 is placed. For example, the one or more feet 132 may prevent the bottom surface 108 from being scratched or scuffed. Yet further, the one or more feet 132 may ensure the base 102 is level upon the surface it rests upon. As a nonlimiting example, the one or more feet 132 may be comprised of silicone. Though, persons having ordinary skill in the art will appreciate the one or more feet 132 may be comprised of any suitable alternative to silicone (e.g., rubber).

Finally, other implementations of the disclosure will be apparent to those skilled in the art from consideration of the specification and practice of the disclosure disclosed herein.

It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. An organizer for storing culinary receptacles comprising:

a base including:
- a top surface,
- a bottom surface,
- an exterior sidewall disposed between the top surface and the bottom surface, and
- a first plurality of magnets disposed within the exterior sidewall; and a curtain including:
- a front surface,
- a back surface,
- the front and back surface bound by:
  - a top edge,
  - a bottom edge,
  - a first side edge, and
  - a second side edge, a first bullnose disposed between the top edge and the first side edge, a second bullnose disposed between the top edge and the second side edge, and a second plurality of magnets disposed within the front surface, the second plurality of magnets reversibly couplable to the first plurality of magnets, such that the organizer may be in at least one of a coupled configuration and a decoupled configuration.

2. The organizer of claim 1, wherein the base is further comprised of an interior sidewall disposed about the top surface.

3. The organizer of claim 2, wherein the base is further comprised of a base top edge disposed between the exterior sidewall and the interior sidewall.

4. The organizer of claim 3, wherein the top surface, the interior sidewall, and the base top edge define an organizer storage cavity able to house a plurality of storage containers.

5. The organizer of claim 1, further comprising:

one or more feet disposed upon the bottom surface of the base.

6. The organizer of claim 1, wherein at least one of the base and the curtain are covered in a fabric covering.

7. The organizer of claim 6, wherein the fabric covering conceals at least one of the first plurality of magnets and the second plurality of magnets.

8. The organizer of claim 1, wherein the base is further comprised of an exterior sidewall length and an exterior sidewall width.

9. The organizer of claim 8, wherein in the coupled configuration, the curtain is disposed upon the exterior sidewall length.

* * * * *